April 18, 1944. L. POLLACK 2,346,784
METHOD OF AND MEANS FOR MAKING POLARIZING BODIES
Filed March 2, 1938   2 Sheets-Sheet 1
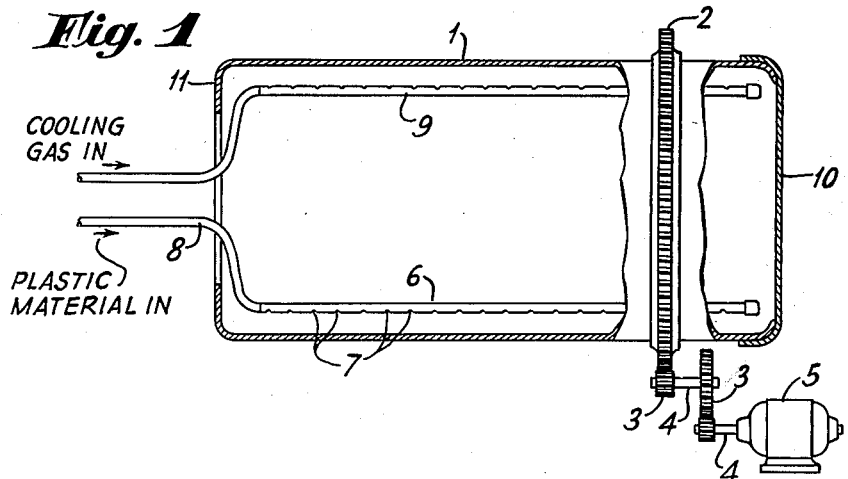
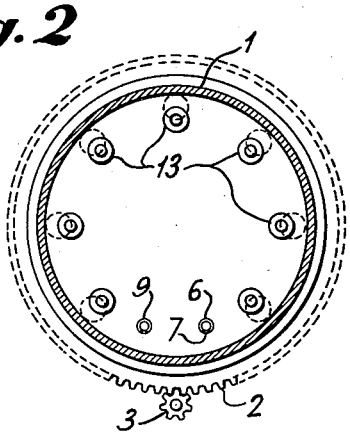
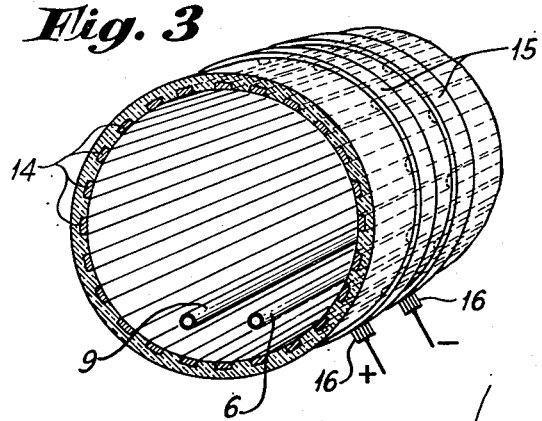
INVENTOR.

April 18, 1944.  L. POLLACK  2,346,784
METHOD OF AND MEANS FOR MAKING POLARIZING BODIES
Filed March 2, 1938  2 Sheets-Sheet 2
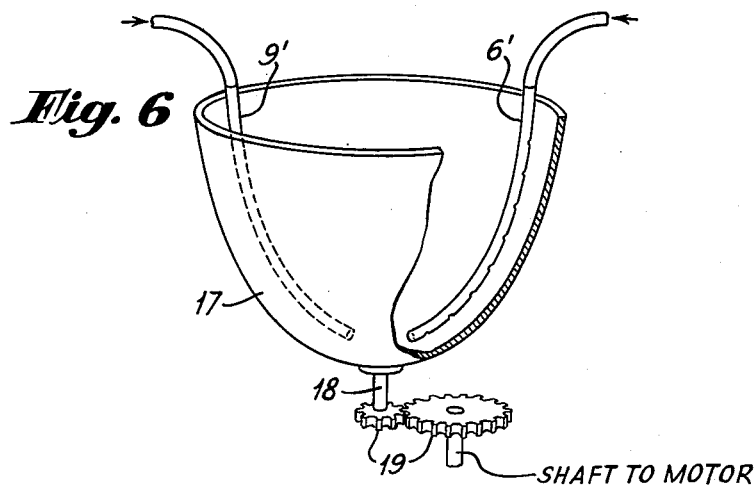
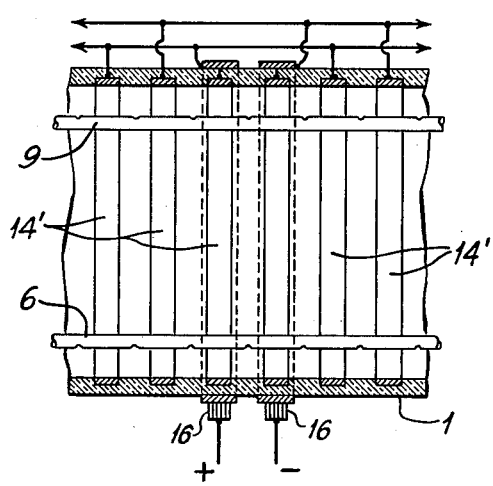
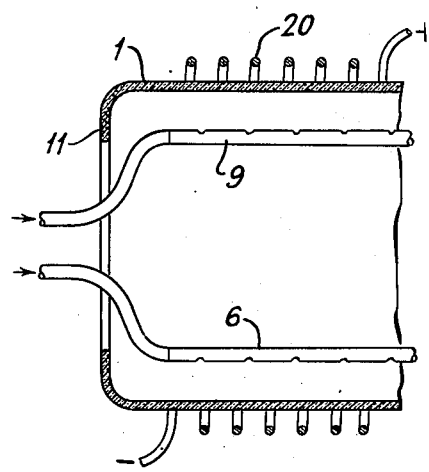
INVENTOR.

Patented Apr. 18, 1944

2,346,784

UNITED STATES PATENT OFFICE 2,346,784

METHOD OF AND MEANS FOR MAKING POLARIZING BODIES

Leon Pollack, Brooklyn, N. Y., assignor to Polaroid Corporation, Cambridge, Mass., a corporation of Delaware Application March 2, 1938, Serial No. 193,544

11 Claims. (Cl. 18—26)

The present invention relates to light polarizing bodies, and particularly to a method of and means for orienting asymmetric particles suspended in or supported on a suitable medium.

One object of the invention is to enable the manufacture of a light polarizing body in a simple, convenient and efficient manner.

Another object of the invention is to provide a method of orienting polarizing crystals in a medium by the application of centrifugal force.

A further object is to provide a method for permanently orienting an assemblage of asymmetric colloidal particles embedded in or located on a supporting medium by means of force effected by a rotating body.

A still further object is to prepare a polarizing body by placing a plastic mass of the material from which the body is to be formed upon a suitable bed and imparting a curvilinear motion to the bed, whereby the particles or molecules of said material which exhibit polar characteristics are aligned in substantial parallelism.

Very generally speaking, the invention relates to a method of orienting polarizing or asymmetric crystals, molecules or particles by centrifugal force and to suitable apparatus employed for achieving this result. In accordance with one embodiment of the invention, a rotating cylindrical drum is employed as a centrifuge, and a fluid plastic mass in which the asymmetric particles have been homogeneously embedded is uniformly distributed on the interior of the drum, as by spraying. The effect of the rotation of the drum is to produce a centrifugal force on the particles which aligns them with their polarizing axes in substantial parallelism. The apparatus employed for this purpose is herein designated as a centrifuge. The plastic mass, after setting or hardening, may be stripped from the interior of the drum which acts as a bed for the material. It is preferred, though not necessary, that the plastic mass be chilled to hasten the setting or hardening after the particles have been suitably aligned. According to another embodiment of the invention, a plurality of rolls are employed in the interior of the drum to assist in the aligning of the polarizing particles while the drum is rotating. According to a further embodiment an electric field is employed to act on the polarizing particles or the crystals while the drum is being rotated. A still further embodiment utilizes a parobolic type of container or form instead of a drum to align the colloidal particles of the plastic mass.

An advantage of the present invention lies in the fact that a polarizing sheet of any desired dimension can very readily be obtained merely by choosing a drum or container of suitable size. Thus, for example, if there is employed a drum which is relatively long and has a wide diameter, there may be obtained a polarizing sheet having substantially the same length as the drum and a width which has the same dimension as the interior circumference of the drum.

Among the features of the invention are the different types of rotating containers or forms; and the means employed for spraying and chilling the plastic mass containing the polarizing particles or crystals.

Other objects, features and advantages will become apparent from a reading of the following description which is accompanied by drawings, wherein:

Fig. 1 is a vertical section of a cylindrical drum and associated apparatus for carrying out the process of the invention, in accordance with one embodiment;

Fig. 2 is a cross-section, end view, of another embodiment of the invention, showing the rollers employed for aiding in the alignment of the crystals during rotation of the bed;

Figs. 3, 4 and 5 are fragmentary views of other embodiments of the invention employing electric fields, showing only the details necessary for an understanding of the essential principles involved; and Fig. 6 shows a further embodiment of the invention, wherein a bed of parabolic form is employed to carry out the process of the invention.

The invention contemplates the production of a polarizing body from any flowing plastic material which contains homogeneously embedded polarizing crystals of an asymmetric nature added to the material, or inherently contains molecules or particles possessing a polar characteristic. As an illustration, the plastic material may consist of a colloidal suspension of dichroic crystals such as asymmetric particles of herapathite (sulphate of iodoquinine) or purpureocobaltchloride-sulphateperiodide, dispersed in cellulose acetate, a suitable organic material. If herapathite crystals are used, care should be taken to use only one variety in the colloidal suspension since the geometric disposition of the polarizing axes in the two varieties is different. As a further illustration, the plastic material may be a suitable dielectric material whose molecules have a polar characteristic and which has been heated until the material is in a molten, plastic or liquid condition. Suitable dielectric materials, here mentioned by way of example only, are quartz and tourmaline crystals, and certain artificial resins. These materials are more or less optically transparent and contain polarizing molecules which in plastic state can move relative to one another to assume predominantly one direction under the influence of mechanical force and/or electric stress.

Fig. 1 illustrates one form of centrifuge apparatus suitable for carrying out the process of the invention. Member 1 is a hollow drum of a desired size having a cover plate 10 at one end and a flange 11 at its other end. The outer surface of drum 1 is provided with a gear 2 meshing with a suitable drive source including other gears 3, 3, shafts 4, 4 and a drive motor 5. Motor 5 is thus arranged to rotate drum 1 at a suitably rapid rate. The interior surface of drum 1 is polished to be smooth, and may consist of metal, a refractory material, or any suitable element, depending on the kind of plastic material to be deposited thereon, from which the polarizing body is to be made. In the interior of the drum 1 is a stationary pipe 6 located near the inner surface of the drum for spraying the plastic material containing the asymmetric particles along the entire length of the drum. For this purpose, the lower part of the pipe is provided with holes 7 regularly spaced along the length of the pipe, as shown, in order that an extremely thin layer of the suspension can be uniformly applied to the interior of the drum as the latter is being rotated. The plastic material from which the polarizing material is to be formed is fed into one end of the pipe 6 by means of a suitable tube 8. The other end of pipe 6 is closed. Of course, if desired, the tube 8 can be arranged to feed the spray pipe 6 from the center, in which case both ends of pipe 6 will preferably be closed. Where desired, there may be provided a cooling system comprising another pipe 9 for supplying a chilling gaseous fluid, such as air, to harden or set the deposited plastic layer in the process of manufacture, after the asymmetric particles or polarizing molecules have been aligned in parallelism.

In the operation of the invention, the drum 1 is first rapidly rotated, and then a fine spray of the plastic material is deposited by pipe 6 on the interior of the drum while the drum is rotating. The interior of the drum 1 thus provides a bed for the plastic material and obtains a uniform and continuous thin coating whose thickness depends upon the fineness and duration of the spray. After a desired thickness of coating is deposited, the spray is shut off in any suitable manner, not shown. Due to the rotation of the drum, the fluid or plastic coating will cling to the interior of the drum, and the asymmetric particles embedded in the coating will have a centrifugal force applied to them which will align or orient them into substantial parallelism. This alignment of the polarizing particles or crystals in the layer or coating occurs before the plastic layer or mass has had an opportunity to set or harden. After the alignment of the polarizing crystals, the drum continues to rotate until the plastic coating is definitely solidified. To hasten the process of solidification or setting, the layer or coating may be chilled by the cooling gaseous fluid in stationary pipe 9 which can be turned on or off at will.

After hardening of the layer, the drum is stopped and the cover 10 thereof is removed and the coating is stripped from its bed. The coating will be in the form of a sheet in which the axes of the particles embedded in the suspending medium are oriented or aligned in one direction.

Fig. 2 is a modification of the apparatus of Fig. 1, and shows a plurality of rollers 13 distributed around the interior of the drum for aiding in the alignment of the crystals embedded in the plastic coating during the process of manufacturing the polarizing body. These rollers are adjustable in position from a point outside the drum and may be moved at will to assume the positions indicated by the dotted lines. The rollers extend substantially along the entire length of the interior surface of the drum and are arranged to contact the plastic coating or layer after it has been deposited and while the drum is rotating, but before the coating has become set or hardened. In this way, the influence of centrifugal force caused by rotation of the drum and also the contacting force of the rollers are both brought to bear simultaneously on the polarizing crystals to cause their alignment.

The spray pipe 6 and the chilling pipe 9 are shown in Fig. 2 to be side by side, for convenience.

Fig. 3 shows one way in which an intense electrostatic field can be used with the rotating drum to assist in the alignment of the particles or crystals. In this figure, there are shown a multiplicity of narrow, spaced, electrically conducting bars 14, 14 located longitudinally of the drum 1 around the interior circumference thereof. The drum in this embodiment is, of course, made of an insulating material. The bars are imbedded in the drum so as to lie flush with the interior surface of the drum, thus producing a very smooth surface to which the plastic material is applied. Alternately arranged bars 14, 14 are shown connected to externally located metallic strips 15, 15, in turn contacting a pair of brushes 16, 16 connected to opposite terminals of a source of unidirectional potential. In this way, adjacent bars 14, 14 will be maintained at potentials of opposite polarity. By means of this arrangement, a strong electrostatic field or force is caused to act on the crystals of the plastic coating while the drum is rotating, thus assisting the centrifugal force in orienting the crystals in parallelism. In this embodiment, the crystals will all tend to align at right angles to the longitudinal dimensions of the bars and the drum.

Fig. 4 shows another embodiment, wherein electrically conducting bars 14', 14' are arranged in circles in the interior of insulation drum 1 in order to align the crystals along the longitudinal dimension of the drum. Since there exists an intense electrostatic field of force between adjacent bars, the molecules or particles or crystals which exhibit polar characteristics will tend to be oriented at right angles to the bars.

Where the molecules, particles or crystals can be influenced by a magnetic field, it is preferred to use an intense unidirectional electromagnetic field to align these particles. Fig. 5 illustrates one method by which this may be carried out. In this figure, the drum 1 is again made from insulation material, and the magnetic field is produced by a coil 20 located externally of and surrounding the drum. Coil 20 extends over the entire length of drum 1 and has its terminals connected to a suitable source of unidirectional potential. The particles in the deposited layer will in this instance also tend to orient themselves along the length or longitudinal dimension of the drum.

Fig. 6 illustrates a parabolic container 17 for carrying out the invention. Container 17 is rotated around its vertical axis by means of shaft 18 and gearing 19, in turn driven by a motor, not shown. The plastic material is applied to the interior of the container by pipe 6', and the coating thus applied may be chilled by the gas in pipe 9'. Both pipes are preferably curved to take the form of the interior surface of the paraboloid. The steps of manufacture are the same as those described above in connection with the other figures and will not be repeated.

The principles underlying the operation of the apparatus of Fig. 6 are believed to be apparent. The rotation of container or bed 17 produces, by curvilinear motion, a centrifugal force which causes the deposited coating to cling to the sides of the bed, and aligns or orients the particles into substantial parallelism.

It should be distinctly understood that the invention is not limited to the particular methods outlined hereinabove, or to the precise arrangements of apparatus illustrated since various changes may be made without departing from the spirit and scope of the invention. Where desired, various features from the different figures may be combined in a single apparatus, for example, the rollers and electric field can both be used simultaneously to act upon the layer of suspension while the drum is rotating.

What is claimed is:

1. A centrifugal machine comprising a hollow rotatable drum, means for depositing in the interior of said drum a plastic material containing orientable crystals, and means for applying a unidirectional electrostatic field to said material while in said drum for orienting the polarizing axes of said crystals into substantial parallelism, said means including a plurality of spaced electrical conductors in the interior of said drum, adjacent conductors of which have opposite polarities.

2. In the process of preparing a light transmitting and polarizing body, the steps which include preparing a solution of a light transparent cellulosic derivative plastic material containing orientable light polarizing crystals in suspension, and applying a centrifugal force to a thin layer of said suspension, in such manner and for such time that the polarizing axes of said crystals are oriented into substantial parallelism, and permitting the plastic material to set, thereby holding said oriented crystals in permanent alignment.

3. In the process of preparing a polarizing body, the steps which include applying a centrifugal force to a plastic material containing orientable crystals in suspension, and simultaneously maintaining a unidirectional electric field upon said material, in such manner and for such time that the polarizing axes of said crystals are oriented into substantial parallelism, and permitting the plastic material to set, thereby holding said oriented crystals in permanent alignment.

4. The process of making a light transmitting and polarizing body which comprises heating an optically transparent material containing orientable light polarizing molecules until it is in a plastic state, applying centrifugal force to said plastic material in such manner as to produce orientation of the polarizing axes of said molecules into substantial parallelism, and solidifying said material under the influence of said centrifugal force.

5. The process of making a polarizing body which comprises heating an optically transparent material containing orientable molecules until it is in a plastic state, applying centrifugal force to said plastic material and simultaneously therewith a unidirectional field, in such manner as to produce orientation of the polarizing axes of said molecules into substantial parallelism, and solidifying said material under the influence of said centrifugal force.

6. The method of making a light transmitting and polarizing body which comprises heating an optically transparent material containing orientable light polarizing molecules until it is in a plastic state, depositing a layer of substantially uniform thickness of said plastic material onto a curved surface rotating about its longitudinal axis, whereby the centrifugal force produced by said rotating surface orients the polarizing axes of said molecules into substantial parallelism, and solidifying said layer while said surface is in motion.

7. In the process of manufacturing a light polarizing body, the steps which include preparing a solution of a transparent cellulosic derivative plastic material containing orientable light polarizing crystals in suspension, spraying at one time substantially the entire length of the inner surface of a drum, and rotating the drum during the introduction of said material, the speed of rotation being such that a layer of said suspension is held by centrifugal force in uniform distribution on the inner surface of said drum and said crystals are oriented by centrifugal force into substantial parallelism, the period of time of rotation of said drum being such as to permit said suspension to solidify with said crystals in the desired orientation.

8. Apparatus for manufacturing a light polarizing body comprising a hollow rotatable bed, means specially adapted for depositing on the interior surface of said bed a plastic material having orientable crystals from which said polarizing body is to be formed, whereby a layer of said plastic material is uniformly distributed on said interior surface by the action of centrifugal force produced by the rotation of said bed, means for applying an intense unidirectional electric field to said material for orienting the polarizing axes of said crystals, and means for solidifying said layer as said bed is rotated.

9. The process of making a light polarizing body which comprises heating a material having light transmitting properties and containing orientable molecules until said material is in a plastic state, simultaneously applying a mechanical force to said plastic material in such direction and to such an extent as to align said molecules, and permitting said plastic material to set under the influence of a unidirectional electric field, whereby said molecules are maintained in permanent alignment.

10. In the process of preparing a light transmitting polarizing body, the steps which include preparing a solution of a cellulose acetate plastic material containing orientable light polarizing crystals in suspension, and applying a centrifugal force to a thin layer of said suspension in such manner and for such time that the polarizing axes of said crystals are oriented into substantial parallelism, and permitting the plastic material to set, thereby holding said oriented crystals in permanent alignment.

11. In the process of manufacturing a light transmitting and polarizing body, the steps which include preparing a solution of a transparent plastic material containing orientable light polarizing molecules in suspension, applying a centrifugal force to a layer of said suspension in such manner that the polarizing axes of said molecules are oriented into substantial parallelism by said force, and solidifying said layer while it is under the influence of said centrifugal force, whereby said molecules are maintained in permanent parallelism.

LEON POLLACK.